United States Patent
Ekambaram et al.

(10) Patent No.: US 9,876,770 B1
(45) Date of Patent: Jan. 23, 2018

(54) GROUP PERMISSION BASED LI-FI FILE TRANSFER

(71) Applicant: International Business Machines Corporation, Armonk, NY (US)

(72) Inventors: Vijay Ekambaram, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,691

(22) Filed: Oct. 28, 2016

(51) Int. Cl.
*H04L 29/06* (2006.01)
*H04L 9/08* (2006.01)
*H04B 10/85* (2013.01)
*H04W 12/04* (2009.01)
*H04L 29/08* (2006.01)
*H04B 10/116* (2013.01)
*H04W 4/00* (2009.01)

(52) U.S. Cl.
CPC ......... *H04L 63/0428* (2013.01); *H04B 10/85* (2013.01); *H04L 9/0819* (2013.01); *H04L 67/06* (2013.01); *H04W 12/04* (2013.01); *H04B 10/116* (2013.01); *H04L 9/0852* (2013.01); *H04W 4/008* (2013.01)

(58) Field of Classification Search
CPC ..... H04B 10/116; H04B 10/85; H04L 9/0852; H04L 67/06; H04L 29/06; H04L 9/0819; H04W 4/008; H04W 12/04
See application file for complete search history.

(56) References Cited

U.S. PATENT DOCUMENTS

| | | | | | |
|---|---|---|---|---|---|
| 4,786,900 | A | * | 11/1988 | Karasawa | G07C 9/00031 340/5.32 |
| 7,236,595 | B1 | * | 6/2007 | Bean | H04B 10/85 380/255 |
| 8,699,887 | B1 | * | 4/2014 | Rothenberg | H04B 10/116 315/158 |
| 9,167,429 | B2 | * | 10/2015 | Yamasaki | H04L 9/00 |
| 2015/0071647 | A1 | * | 3/2015 | Suresh | H04B 10/116 398/130 |
| 2015/0128067 | A1 | | 5/2015 | Wong et al. | |
| 2015/0146871 | A1 | * | 5/2015 | Liu | H04L 9/0852 380/256 |
| 2015/0339094 | A1 | | 11/2015 | Rakshit | |

(Continued)

OTHER PUBLICATIONS

U.S. Appl. No. 14/836,395, filed Aug. 26, 2015—Pending Publication.

(Continued)

*Primary Examiner* — Jayesh Jhaveri
(74) *Attorney, Agent, or Firm* — George R. McGuire; Bond Schoeneck & King, PLLC; John Pivnichny

(57) ABSTRACT

A system for enabling group permission based file transfer via Light Fidelity (Li-Fi). A first Li-Fi device is configured to transmit encrypted data by illuminating a target location with a first light source. A second Li-Fi device is configured to transmit a key for decrypting the encrypted data by illuminating the target object with a second light source to define a group permission enabled data transfer zone including a merger of the encrypted data and the key. A third Li-Fi device is configured to download the merger of the encrypted data and the key from the group-permission enabled data transfer zone.

10 Claims, 5 Drawing Sheets

(56) References Cited

U.S. PATENT DOCUMENTS

2015/0358079 A1* 12/2015 Cronin ................. H04B 10/116
398/118
2016/0099774 A1* 4/2016 Sim ..................... H04B 10/116
398/115

OTHER PUBLICATIONS

Abdalah Hilmia—Sending Locatoin-Based Keys Using Visible Light Communication—Jan. 2016; pp. 1-54; Uppsala Universitet.

* cited by examiner

GROUP PERMISSION BASED LI-FI FILE TRANSFER

BACKGROUND

The present invention relates to Light Fidelity (Li-Fi) communications and, more specifically, to group permission based file transfer in a Li-Fi system.

LiFi is a bidirectional, high-speed and fully networked wireless communication technology similar to Wi-Fi. Li-Fi technology operates under the principle that light can be used to carry signals as an alternative to traditional radio frequencies. Li-Fi will work as long as there is no blockage of any kind, between the light source and a receiving device. A one-watt light emitting diode (LED) can establish an Internet connection that supports up to four devices at once. An LED with embedded microchips can produce data rate as fast as 150 Mbps.

For example, a Li-Fi system can be used to provide Internet connectivity to a computing device. A LiFi system includes a lamp driver interconnected to a light source, such as LED lamp. The lamp driver transforms streaming content provide by a server over the Internet into digital signals transmitted by the lamp. A receiving dongle associated with the computing device include a photo detector that can receive the digital light signals. Amplification and processing circuits associated with the photo detector transform the received digital light signals into received application data that can be used by the computer device.

There are several traditional methods to transfer files between users. First, there is eye contact based file transfer. Second, there is handshake based file transfer. Finally, there is mobile tap based file transfer. In any of these methods, there are several scenarios in which digital data transfer (such as file, money) only happens in response to group permission received by multiple users. In other words, prior to any transfer of digital data, several entities have to approve the transfer. Accordingly, there is a need in the art for a way to seamlessly provide group permission based file transfer in a Li-Fi system.

SUMMARY

An embodiment of the invention is a system for enabling group permission based file transfer via Light Fidelity (Li-Fi). A first Li-Fi device is configured to transmit encrypted data by illuminating a target location with a first light source. A second Li-Fi device is configured to transmit a key for decrypting the encrypted data by illuminating the target object with a second light source. A third Li-Fi device is configured to download the merger of the encrypted data and the key. The first Li-Fi device and the second Li-Fi device are configured to simultaneously illuminate the target location with the first light source and the second light source, respectively, to define a group-permission enabled data transfer zone that includes a merger of the encrypted data and the key. One or both of the first Li-Fi device and the second Li-Fi device are configured to visually indicate that the key can decrypt the encrypted data.

Another embodiment of the invention is a method of enabling group permission based file transfer via Light Fidelity (Li-Fi). The first step is using a first Li-Fi device to transmit encrypted data by illuminating a target location with a first light source. The second step is using a second Li-Fi device to transmit a key for decrypting the encrypted data by illuminating the target object with a second light source. The first Li-Fi device and the Li-Fi device simultaneously illuminate the target location with the first light source and the second light source, respectively, to define a group-permission enabled data transfer zone that is a merger of the encrypted data and the key. One or both of the first Li-Fi device and the second Li-Fi device can visually indicate that the key can decrypt the encrypted data, such as by changing the color or illumination. A third Li-Fi device may then download the merger of the encrypted data and the key from the group-permission enabled data transfer zone.

A further embodiment of the invention is a computer program product for enabling group permission based file transfer via Light Fidelity (Li-Fi) having program instructions executable by a computing device to cause the computing device to transmit encrypted data by illuminating a target location with a light source, to transmit a key for decrypting the encrypted data by illuminating the target object with the light source, or to download decrypted data from the target location. The program instructions further cause the computing device to simultaneously transmit the encrypted data at the same time that another such computing device transmits the key, or to simultaneously transmit the key for decrypting the encrypted data at the same time that another such computing device transmits the encrypted data. The target location defines a group-permission enabled data transfer zone having a merger of the encrypted data and the key. The program instructions further cause the computing device to visually indicate that the key can decrypt the encrypted data. The program instructions can also cause the computing device to download the decrypted data after a simultaneous transmission of encrypted data and the key.

DETAILED DESCRIPTION

Figure 1:
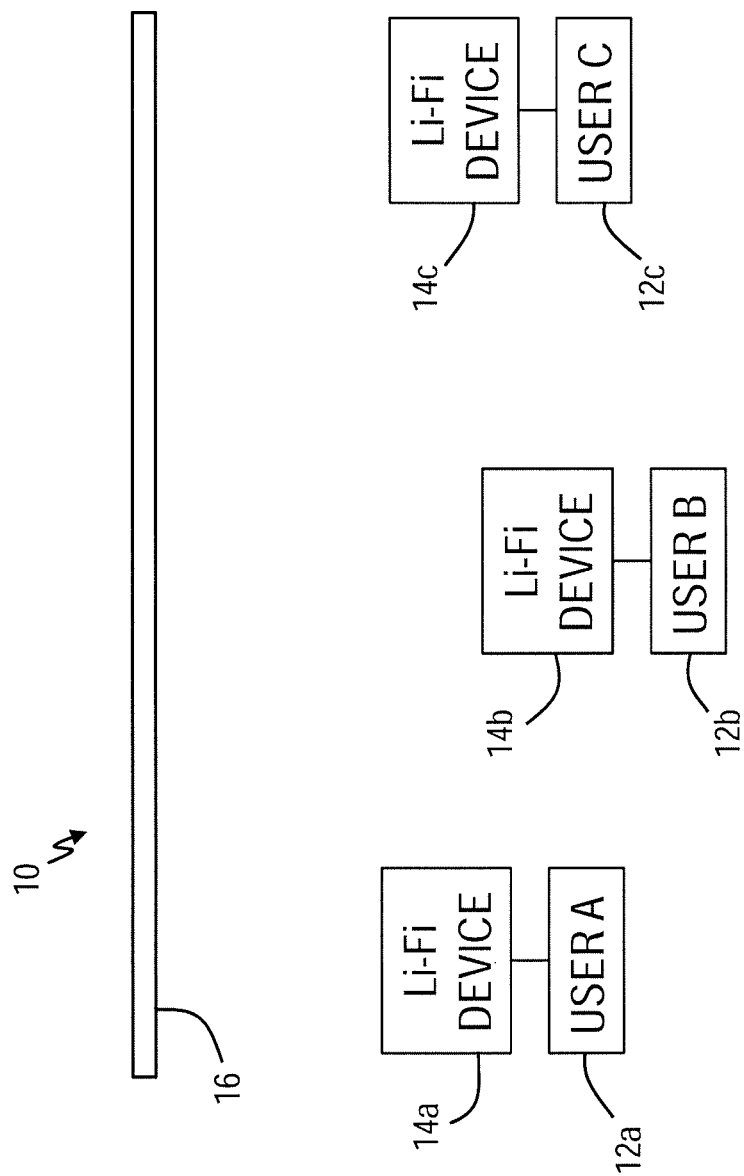
FIG. 1 is a schematic of a system for enabling group permission based file transfer via Li-Fi.

Referring to the figures, wherein like numerals refer to like parts throughout, there is seen in FIG. 1 a Li-Fi system 10 enabling group permission based file transfer. System 10 allows for secure transfer between multiple users 12a, 12b, 12c, each of whom have a Li-Fi device 14a, 14b, 14c, respectively, that can transmit and receive Li-Fi data. For example, Li-Fi device 14 may include an LED and associated encoding circuitry for sending digital data via the LED along with a photodetector and associated decoding circuitry for receiving and interpreting the digital data. Users 12a, 12b, 12c each have a line of sight to a common object 16.

Figure 2:
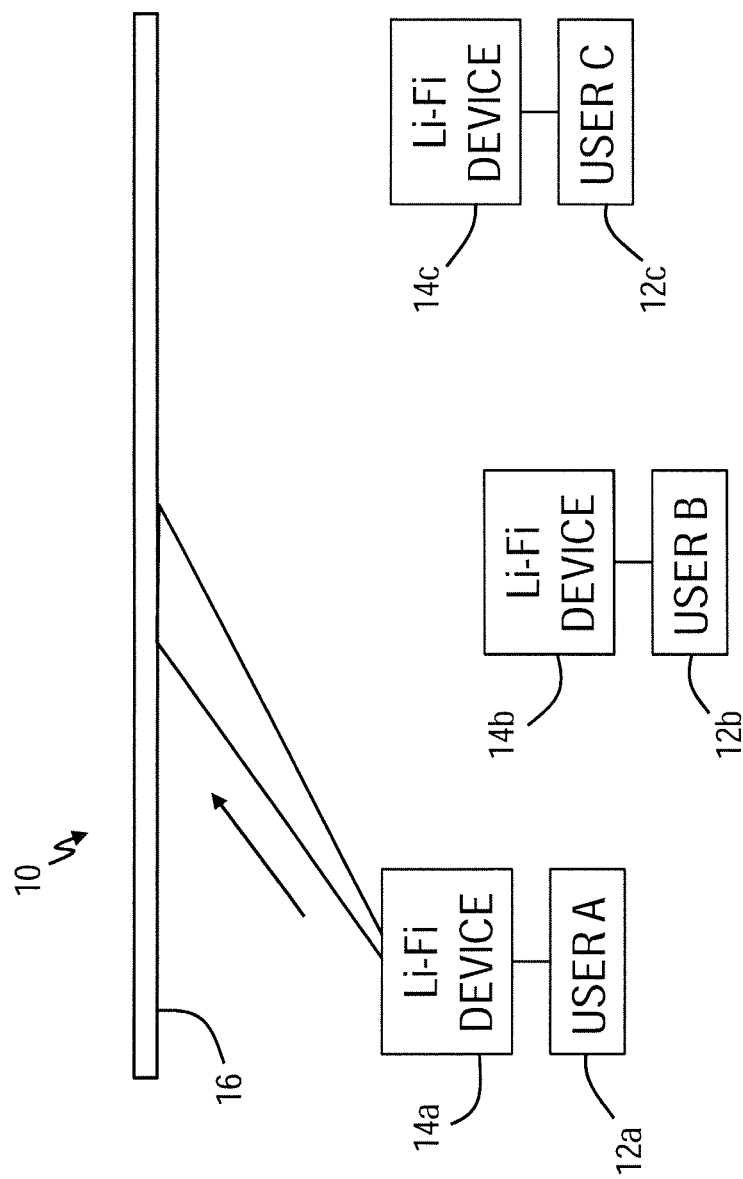
FIG. 2 is a schematic of a system for enabling group permission based file transfer via Li-Fi.

Referring to FIG. 2, group permission based file transfer can occur by user 12a directing Li-Fi device 14a at common object 16 so that light is projected thereon. Encrypted data may then be shared by user 12a using Li-Fi, i.e., Li-Fi device 14a of user 12a uses digital light signals to transmit the encrypted data by flashing the light signals onto common object 16.

Figure 3:
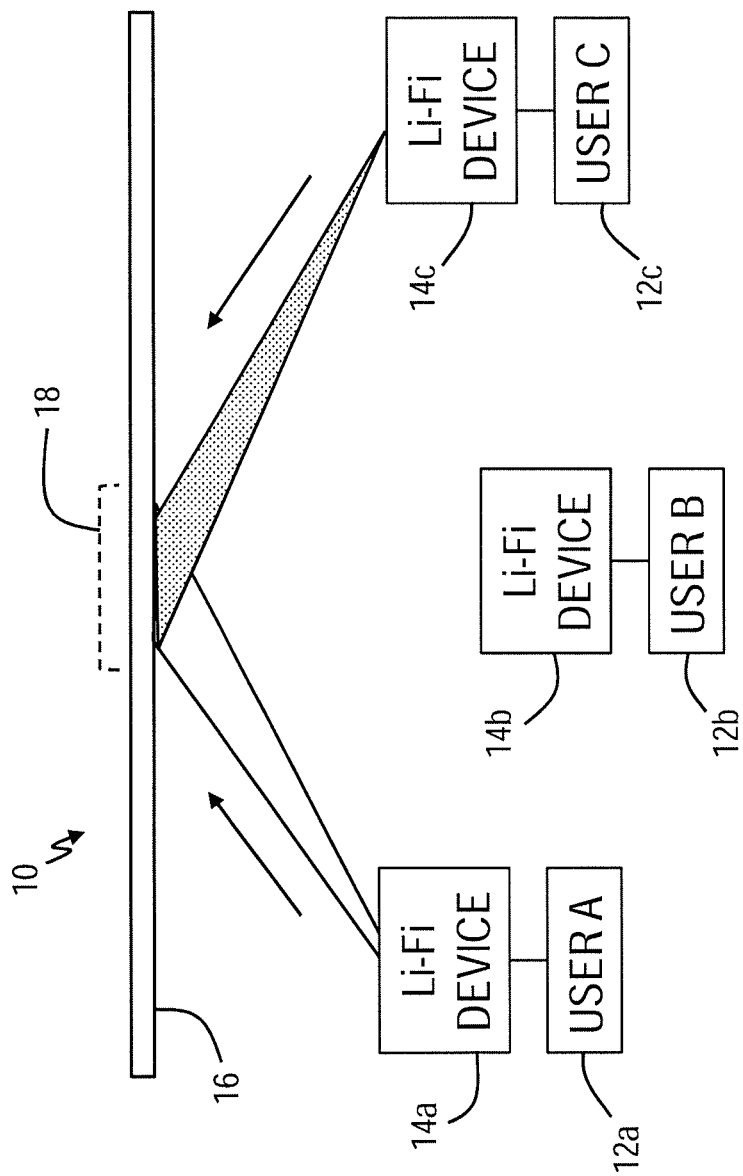
FIG. 3 is a schematic of a system for enabling group permission based file transfer via Li-Fi.

Referring to FIG. 3, User 12c may then direct his or her Li-Fi device 14c at common object 16 to share a secret key via Li-Fi. Because user 12a and user 12c are both transmitting onto object 16, data in the light beams projected by user 12a and user 12b are merged and define an intersecting data transfer zone 18 at object 16. If the key transmitted by user 12c matches the encrypted data transmitted by user 12a, the color of the light transmitted by user 12a and user 12c may be changed to indicate that the encrypted file has been approved for others to access, such as by changing the color to green.

Interference between the light source of Li-Fi device 14a and 14c may be avoided by making sure that the signals never intersect at a common time-slot. In other words, the merger can actually be a synchronization of the switching of the LED or light source between Li-Fi devices 14a and 14c. For simplicity, assuming User A has one half of data as "101" User C has another half of data "110." User B has to get "110110", (i.e. one bit from A followed by one bit from C and then A and so on. User A can convert its data as 100010 by adding a dummy bit '0' after every bit and projects 100010 onto common object 16. User C converts its data as 010100 by adding a dummy bit '0' before every bit and projects 010100 onto common object 16. User B may then receive the merged projection from object 16, which will be the desired "110110".

Figure 4:
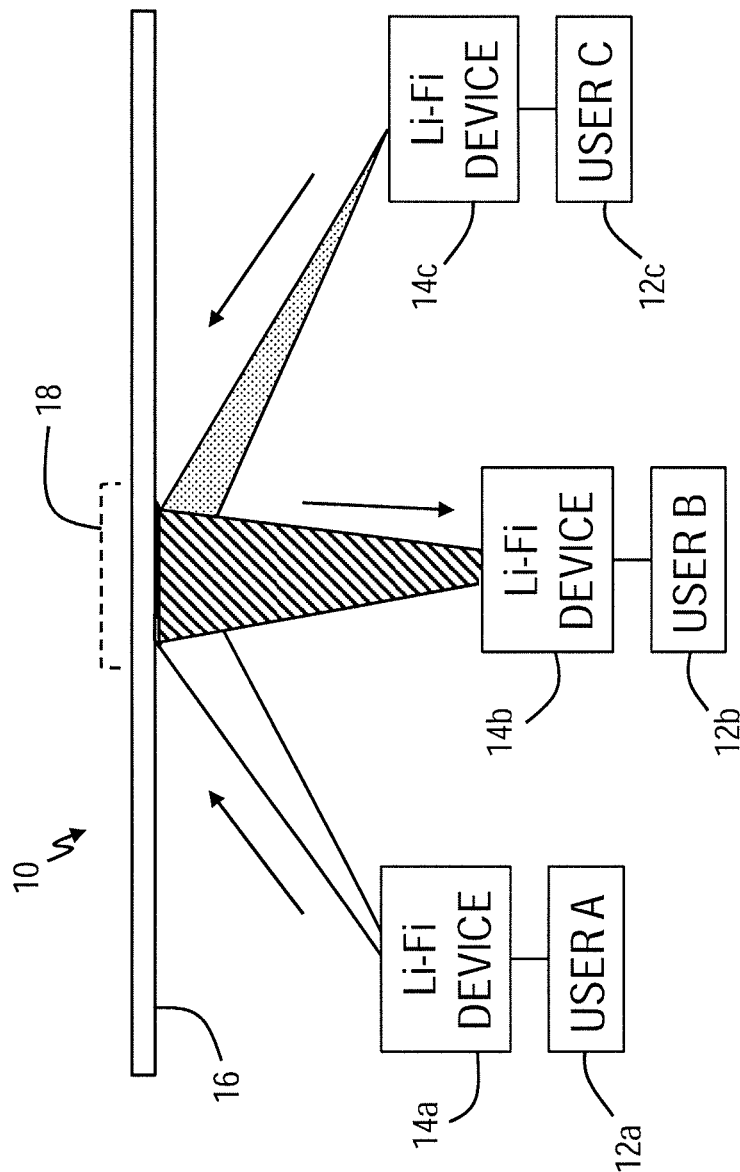
FIG. 4 is a schematic of a system for enabling group permission based file transfer via Li-Fi.
Figure 5:
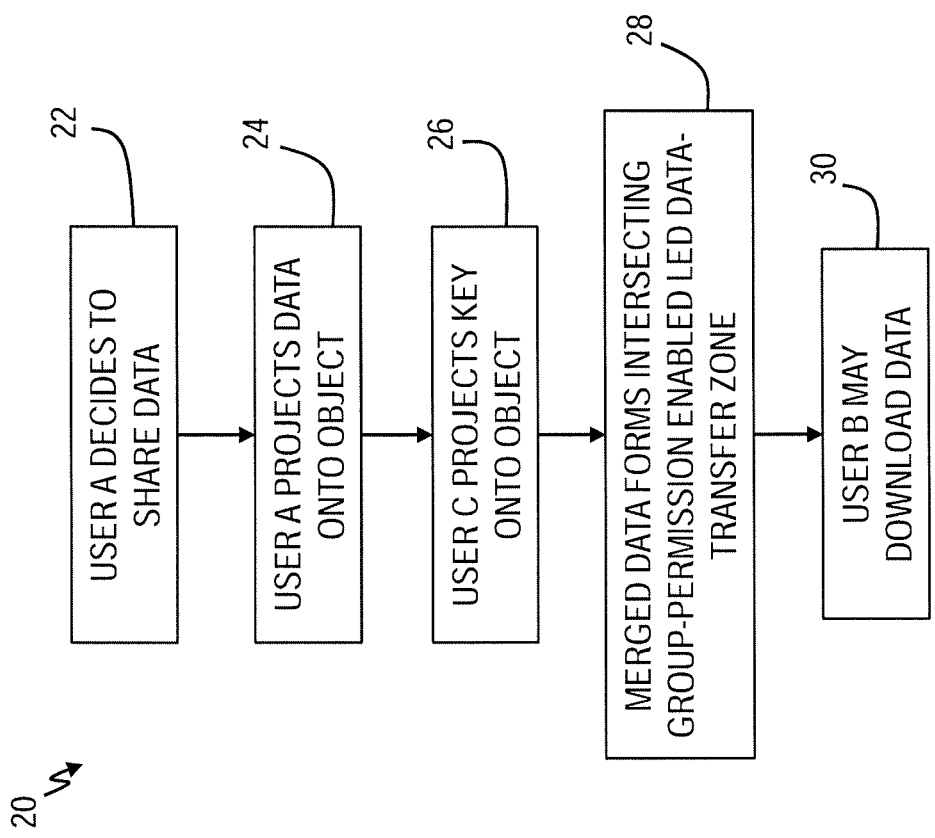
FIG. 5 is a flowchart of a method for enabling group permission based file transfer via Li-Fi.

Referring to FIG. 4, user 12b may now focus his or her Li-Fi device 14b upon common object 16 to receive the digital data provided by user 12a and unlocked by user 12c. It should be recognized that if multiple permissions are necessary, each individual that needs to grant permission must also directed his or her device at the intersecting group-permission enabled LED data-transfer zone. Data transfer may only occur when all owners have merged the necessary keys by projecting the key onto the intersecting group permission enabled LED data-transfer zone.

A method 20 of performing group permission based file transfer where, for example, a User A having a Li-Fi enabled device, such as smart glasses fabricated with an LED transmitter and receiver, decides to share digital date with a User B 22, but needing the approval of a User C. User A first focus his or her gaze view on a common object and enables LED light to project the encrypted digital data using the LED light of the Li-Fi enabled device on the focused object 24. At this point, the data is inaccessible because it is encrypted and requires the key from User C. To provide the key, User C also focuses his or her view on the common object and enables the LED light of his or her Li-Fi enabled device to project the key 26. The light beams of User A and C merge at the common object, thereby merging the digital data encoded in the light beams at the common object and forming an intersecting group-permission enabled LED data-transfer zone 28. Once merged, the digital data shared by User A becomes open and, optionally, the light beam color of Users A and C changes to green to indicate that Users A and C have approved others to download the file. User B may now download the unlocked data 30 by directing his or her Li-Fi enabled device at the common object (i.e., the intersecting LED data transfer zone) to receive the digital data shared by A and C instantaneously.

Method 20 thus realizes seamless group permission enabled digital data transfer by requesting that the owners of the data gaze at a common object/point to create an intersecting group-permission enabled LED data-transfer zone. Any legitimate user who wishes to download the data merely has to direct his or her Li-Fi enabled device at the intersecting group-permission enabled LED data-transfer zone and data downloading can happen instantaneously.

Method 20 may be implemented via software, such as an application, that resides on each Li-Fi device 14a, 14b, 14c.

The descriptions of the various embodiments of the present invention have been presented for the purposes of illustration, but are not intended to be exhaustive or limited to the embodiments disclosed. Many modification and variations will be apparent to those of ordinary skill in the art without departing from the scope and spirit of the described embodiments. The terminology used herein was chosen to best explain the principles of the embodiments, the practical application or technical improvement over the technologies found in the market place, or to enable others of ordinary skill in the art to understand the embodiments disclosure herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for enabling group permission based file transfer via Light Fidelity (Li-Fi), comprising:
    a first Li-Fi device configured to transmit encrypted data by illuminating a target location with light emitted by a first light source;
    a second Li-Fi device configured to transmit a key for decrypting the encrypted data by illuminating the target location with light emitted by a second light source, wherein the first Li-Fi device and the second Li-Fi device are oriented such that the light emitted by the first light source and the light emitted by the second light source intersect to define a data transfer zone on a surface of the target location, wherein the target location is separate from the first and second Li-Fi devices, and wherein at least one of the first Li-Fi device and the second Li-Fi device is configured to visually indicate, if the transmitted encrypted data is decrypted by the transmitted key, that the encrypted data is available for access from the data transfer zone; and
    a third Li-Fi device configured to download a merger of the encrypted data and the key from the data transfer zone.

2. The system of claim 1, wherein the first Li-Fi device and the second Li-Fi device are configured to simultaneously illuminate the target location with the first light source and the second light source, respectively.

3. The system of claim 2, wherein the simultaneous illumination of the target zone comprises synchronization of the first light source and the second light source.

4. The system of claim 3, wherein the group-permission enabled data transfer zone comprises a merger of the encrypted data and the key.

5. A method of enabling group permission based file transfer via Light Fidelity (Li-Fi), comprising:
    using a first Li-Fi device to transmit encrypted data by illuminating a target location with light emitted by a first light source;
    using a second Li-Fi device to transmit a key for decrypting the encrypted data by illuminating the target location with light emitted by a second light source, wherein the first Li-Fi device and the second Li-Fi device are oriented such that the light emitted by the first light source and the light emitted by the second light source intersect to define a data transfer zone on a surface of the target location, wherein the target location is separate from the first and second Li-Fi devices, and wherein at least one of the first Li-Fi device and the second Li-Fi device is configured to visually indicate, if the transmitted encrypted data is decrypted by the transmitted key, that the encrypted data is available for access from the data transfer zone; and
    using a third Li-Fi device configured to download a merger of the encrypted data and the key from the data transfer zone.

6. The method of claim 5, wherein the first Li-Fi device and the second Li-Fi device simultaneously illuminate the target location with the first light source and the second light source, respectively.

7. The method of claim 6, wherein the simultaneous illumination of the target location comprises synchronization of the first light source and the second light source.

8. The method of claim 7, wherein the group-permission enabled data transfer zone comprises a merger of the encrypted data and the key.

9. A computer program product for enabling group permission based the transfer via Light Fidelity (Li-Fi), the computer program product comprising non-transitory computer readable storage medium with instructions stored thereon, the program instructions executable by a computing device to cause the computing device to:

transmit encrypted data by illuminating a target location with light emitted by a first light source of first Li-Fi device;

transmit a key for decrypting the encrypted data by illuminating the target location with light emitted by a second light source of a second device, wherein the light emitted by the first light source and the light emitted by the second light source intersect to define a data transfer zone on a surface of the target location;

visually indicate in at least one of the first Li-Fi device and the second Li-Fi device, if the transmitted encrypted data is decrypted by the transmitted key, that the encrypted data is available for access from the data transfer zone; and download decrypted data from the target location.

10. The computer program product of claim 9, wherein the program instructions further cause the computing device to simultaneously transmit the encrypted data at the same time that another such computing device transmits the key, or to simultaneously transmit the key for decrypting the encrypted data at the same time that another such computing device transmits the encrypted data.

* * * * *